United States Patent [19]

Gottling

[11] Patent Number: 4,577,732
[45] Date of Patent: Mar. 25, 1986

[54] BRAKE APPARATUS TO RETARD RELATIVE MOVEMENT BETWEEN TWO MEMBERS

[75] Inventor: Helmut Gottling, Isernhagen, Fed. Rep. of Germany

[73] Assignee: WABCO Westinghouse Steuerungstechnik GmbH, Hanover, Fed. Rep. of Germany

[21] Appl. No.: 612,113

[22] Filed: May 21, 1984

[30] Foreign Application Priority Data

May 26, 1983 [DE] Fed. Rep. of Germany ....... 3319042

[51] Int. Cl.$^4$ ............................................. F15B 15/26
[52] U.S. Cl. ........................................ 188/67; 92/24; 92/27; 188/265
[58] Field of Search ................. 188/67, 196 P, 196 V, 188/265, 300; 74/531; 70/181; 92/24, 27; 267/64.12; 192/114 R

[56] References Cited

U.S. PATENT DOCUMENTS

| 2,348,611 | 5/1944 | Davidson | 188/67 |
| 3,019,502 | 2/1962 | Walker, Jr. | 188/67 |
| 3,251,278 | 5/1966 | Royster | 92/24 X |

Primary Examiner—Bruce H. Stoner, Jr.
Assistant Examiner—Richard R. Diefendorf
Attorney, Agent, or Firm—J. O. Ray, Jr.

[57] ABSTRACT

A brake apparatus is provided to retard the relative movement between two members. The apparatus comprises a housing positioned around the perimeter of a portion of one of the members. A collar is fixedly secured to the housing generally around the perimeter of a portion of one of the members. Clamping elements are fixedly secured to the collar and have a first surface positioned generally coaxial with at least one of the members. The clamping elements move radially to frictionally engage one of the members to apply a braking force. Each of the clamping elements have a ball in abutting rolling relationship with a second surface generally radially opposite the first surface. The balls urge each of their respective clamping elements into such frictional engagement upon axial movement of an actuating device having a third surface in rolling engagement with the ball. One of the second and the third surfaces has a preselected incline with respect to a longitudinal axis of one of the members.

18 Claims, 3 Drawing Figures

BRAKE APPARATUS TO RETARD RELATIVE MOVEMENT BETWEEN TWO MEMBERS

BACKGROUND OF THE INVENTION

The present invention relates in general to braking apparatus and, more particularly, the invention relates to a brake apparatus for retarding relative movement between two members in which at least one of the members is movable and/or turnable axially and which brake apparatus has relatively few parts which move relative to one another.

Such a brake and/or clamping mechanism, for example, can be utilized to brake and lock a piston rod connected to a working piston of a working cylinder and may be actuated by a fluid pressure medium. A working cylinder equipped with such a mechanism may have numerous uses such as, among other things, it is applicable in a window and ventilator actuation arrangement.

Prior to this invention, it was known to provide a brake apparatus with a clamping mechanism which included a first casing encasing the piston rod and a second casing arranged coaxially therewith. In the first casing, radially arranged clearances were provided to receive the clamping elements. On the sides of the clamping elements, which were facing the second casing, bearings were arranged to receive roller bodies which rest against a roller path arranged on the second casing and running diagonally to the longitudinal axis of the piston rod. Therefore, with a shifting movement of the second casing relative to the first casing, the clamping elements may be pushed against the piston rod—depending on the direction of movement with respect to the second casing—so that the piston rod is locked or restrained.

A disadvantage with regard to the clamping mechanism described above is the fact that several parts which are movable relative to each other are required. Therefore, they must be fabricated with great care to ensure very precise fits in order to assure good operating function even under extreme conditions. Evidence of wear frequently appears which is caused by the friction between the individual parts. Examples of such wear may be found between the brake element and the guide for the brake element; the roll body and the roll body bearing in the brake element.

BRIEF SUMMARY OF THE INVENTION

The present invention teaches a brake apparatus for retarding the relative movement between one movable member and a second member. The apparatus comprises a housing that is positioned around the perimeter of at least a portion of one of such members. A collar is fixedly secured to the housing generally around the perimeter of at least a portion of one of the members. At least two flexible clamping elements are provided which are fixedly secured to the collar. The clamping elements have a first surface that is positioned coaxial with and a predetermined distance from at least one of the members. The clamping elements are radially movable to frictionally engage the first surface carried by such clamping elements with one of the members and thereby apply a braking force. The clamping elements have a second surface that is generally radially opposite the first surface. Also provided is at least two ball means, each ball means being in abutting rolling relationship with a respective second surface of the clamping elements for urging such clamping elements into frictional engagement with one of the members. Such frictional engagement occurs when the ball means are rolled longitudinally along the respective second surface of the clamping element in a first direction. An actuating means is provided that is disposed in the housing and is in coaxial alignment with at least a portion of the clamping elements for radially urging the ball means in a direction generally parallel to the axis of at least one of such members. The actuating means also imparts rotational movement to the ball means. The actuating means includes a third surface for longitudinal rolling engagement with the ball means. At least one of the second and third surfaces have a preselected incline with respect to the longitudinal axis of at least one of the members.

OBJECTS OF THE INVENTION

It is, therefore, one of the primary objects of the present invention to provide a brake apparatus for retarding the relative movement between two members which requires relatively few moving parts.

Another object of the present invention is to provide a braking apparatus that can be produced at a relatively low cost.

A further object of the present invention is to provide a braking apparatus that requires fewer friction engaging surfaces.

Still another object of the present invention is to provide a braking apparatus that is relatively easy to assemble and disassemble because of its simple design.

These and various other objects and advantages of the invention will become more apparent to those persons skilled in the braking art from the following more detailed description when taken in conjunction with the attached drawing and appended claims.

DESCRIPTION OF THE INVENTION

Figure 1:
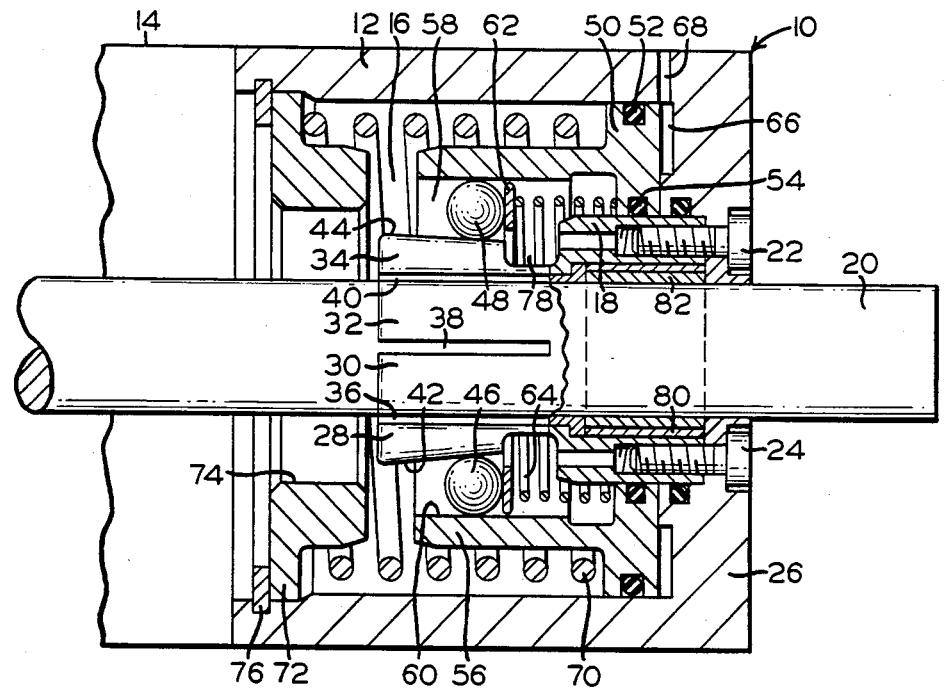
FIG. 1 is a side elevational view partially in cross-section, which shows presently-preferred embodiment of a braking apparatus constructed according to the invention.

In the various views of the drawings, identical parts have been identified with identical reference numerals.

Now referring more particularly to FIG. 1, which illustrates the brake apparatus, generally designated 10, which comprises a housing 12 of a working cylinder 14. In the presently preferred embodiment, a cylindrical clearance 16 is provided in which there is centrically positioned a cylindrical element which is shown as a first casing or collar 18 to receive and guide the cylindrical body 20 which serves in the illustrated example as a piston rod. Furthermore, in the illustrated example, one of the cylinder 14 and the piston rod 20 serve as the movable member which may move in at least one of both a rotational and a longitudinal direction. It is also possible for the movable member to move in both directions simultaneously. Although piston rod 20 is preferably cylindrical, other geometric shapes could possibly be employed for certain types of applications. By means of screws 22 and 24, the first casing or collar 18 is fastened to a wall 26 at one end of the housing 12. The first casing or collar 18 serves as a support means for clamping elements 28, 30, 32 and 34 which are defined at their end-region by slots 36, 38 and 40 having a predetermined width and which are shown running in the direction of the longitudinal axis of the clamping elements 28, 30, 32 and 34 for a predetermined length.

In the presently preferred practice of the invention, the collar 18 and the clamping elements 28, 30, 32 and 34 are formed as a single-piece casting. Clamping elements 28, 30, 32 and 34 are positioned generally coaxial with and a predetermined clearance between the outer surface of piston rod 20 when the brake apparatus 10 is in a release position. The single-piece casting may be made from a material that will permit the clamping elements 28, 30, 32 and 34 to return to the predetermined clearance after a brake force has been applied and released.

The sections of the casing or collar 18 formed by the slots 36, 38 and 40 serve as the clamping elements 28, 30, 32 and 34. Clamping elements 28, 30, 32 and 34 include second outer inclined contact surfaces 42 and 44, in the presently preferred practice of the invention, on which roller bodies 46 and 48 roll in frictional engagement. The second surfaces 42 and 44 of the clamping elements 28, 30, 32 and 34 are generally radially opposite the first surface.

Coaxial to the first casing or collar 18 is a rotary piston 50 which serves as the actuating mechanism and is arranged in the clearance 16 by means of a first sealing gasket 52, and by means of a second sealing gasket 54 positioned for contacting the casing or collar 18 in a sealed and movable manner. The rotary piston 50 exhibits a circular projection serving as the actuating member which is shown as running parallel to the longitudinal axis of the piston rod 20 and forming a second casing 56. The thus developed conical annular clearance 58 between the first casing 18 and the second casing 56 serves the purpose of receiving the globular roller bodies or ball bearings 46 and 48 which rest against the inclined contact surfaces 42 and 44 of the clamping elements 28, 30, 32 and 34 and the inner wall 60 of the second casing 56. By means of an annular element 62, such as a washer, and a pressure spring 64—which supports itself on a surface of the rotary piston 50 and pushes the annular element 62 against the roller bodies 46 and 48—the roller bodies, under slight initial stress, are held on the inclined contact surface of the clamping elements 28, 30, 32 and 34 and the inner wall 60 of the actuating member developed as second casing 56.

The rotary piston 50 with its side turned away from the hull-shaped extension 56, bounds a pressure medium chamber 66 which can be connected with a pressure medium source via a pressure medium connection 68 and a valve mechanism which is not shown. The side of the rotary piston 50 facing the hull-shaped extension 56 is acted upon in the direction of the pressure medium chamber 66 by a release means which preferably comprises pressure spring 70 which supports itself on a bottom plate 72 that is provided with a passage 74 for the piston rod 20. The bottom plate 72 is secured against sliding out of the clearance 16 by means of a retaining ring 76 which is fastened to housing 12. Other retaining means can be provided such as threading the outer surface of retaining ring 76 and the inner surface of housing 12.

Figure 3:
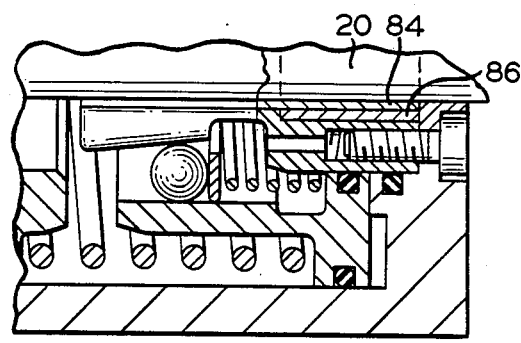
FIG. 3 is a fragmented side elevation view partially in cross-section, which shows an alternative arrangement of a bushing and spacer element to maintain proper clearance of the brake apparatus clamping elements.

The first casing 18, on its side facing the rotary piston 50, exhibits an undercut or recessed area 78 into which the roller bodies 46 and 48 can slide during assembly and/or disassembly of the clamping mechanism by compression of the pressure spring 64 which maintains the roller bodies 46 and 48 in a frictional rolling relationship with the casing 56 and clamping elements 28, 30, 32 and 34. The recessed area 78 also increases the flexibility of clamping elements 28, 30, 32 and 34. As shown in FIG. 1, a bushing 82 is disposed between piston rod 20 and collar 18. Disposed between bushing 82 and collar 18 is a spacer means 80. An alternative arrangement for the bushing and spacer means is shown in FIG. 3. In this arrangement, a spacer means 84 is disposed adjacent piston rod 20 and a bushing 86 is disposed between spacer means 84 and collar 18.

In the following, the operation or function of the brake apparatus and/or clamping mechanism as described above is explained in more detail along with certain alternatives.

As it is shown in FIG. 1, the piston rod 20 is extended to the right out of the cylinder 14. In this position, the brake apparatus 10 is in a release position.

If the working piston and thus also the piston rod 20 are to be locked or restrained in a desired position, a fluid pressure medium is directed into the pressure medium chamber 66 which is bounded on one side thereof by the rotary piston 50, on another side by collar 18, and on two sides by the housing 12. The fluid is directed to chamber 66 via the pressure medium connection 68. The pressure building within the pressure medium chamber 66 shifts the rotary piston 50 and thus also the casing 56 serving as the actuating member to the left, in the direction of the bottom plate 72 and against the force of the spring 70. Due to the friction between the inner wall 60 of the casing 56 and the globular roller bodies 46 and 48 as well as the friction between the roller bodies 46 and 48 against the sloped or inclined contact surfaces 42 and 44 arranged on the clamping elements 28, 30, 32 and 34, the roller bodies 46 and 48 are moved to the left in the direction of the free end of the casing 18 serving as a support or collar for the clamping elements 28, 30, 32 and 34.

Due to the fact that the annular clearance 58 between the two casings 56 and 18 is tapered in the direction of the free ends of both casings 56 and 18, the clamping elements 28, 30, 32 and 34 are pushed into frictional engagement against the piston rod 20 by means of the roller bodies 46 and 48 and the piston rod 20 is locked or restrained from further movement relative to housing 12.

If the restraining of the piston rod 20 is to be released again, the pressure medium chamber 66 bounded on one side by the rotary piston 50 is vented. The pressure spring 70 then pushes the rotary piston 50 and thus also the casing 56 to the right. The roller bodies 46 and 48 roll to the right on the sloped contact surfaces 42 and 44 of the clamping elements 28, 30, 32 and 34 as well as on the contact surface 60 of the inner wall of the casing 56 and then the clamping elements 28, 30, 32 and 34 are released from frictional engagement with piston rod 20.

Figure 2:
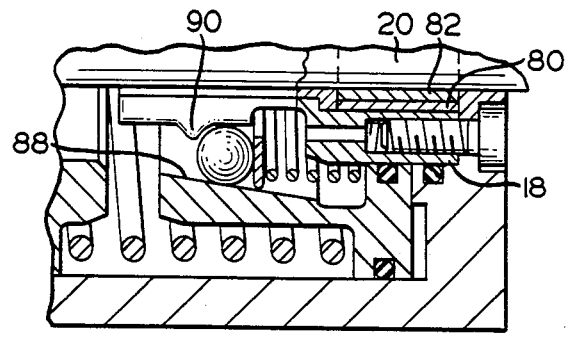
FIG. 2 is a fragmented side elevation view partially in cross-section, which shows an alternative embodiment for the clamping elements and brake actuating means.

As shown in FIG. 2, it is also possible to arrange the inclined contact surfaces 88 for the roller bodies on the inner wall of the second casing 56 and develop the first casing 18 as a cylindrical member.

In order to prevent a rolling out of the roller bodies from the conical annular clearance in connection with an operating design of this type on the free end of at least one of the two casings 56 and 18, a stop 90 can be provided.

In another alternative arrangement, the return spring 70 which acts upon the rotary piston 50 can be arranged in such a way that the brake and/or clamping mechanism is held in the blocking position by spring 20 and can be brought into the release position by means of the fluid pressure medium which acts upon the rotary piston 50. This modification may be preferred for some applications.

It is also feasible to provide a second pressure medium chamber (not shown) which could be bounded on at least one side by the rotary piston 50 instead of a spring 70 so that the rotary piston supporting the casing 56 that serves as the actuating member can be brought into the blocking position as well as the release position.

If one equips the second casing 56 with longitudinal slots and arranges these in a cylinder in such a way that the sections which are bounded by the longitudinal slots can be brought to rest against the inner wall of the housing 12, the sections thus serving as clamping elements can be pushed radially outward against the inner wall of the housing 12 by means of the cylindrical element or piston rod 20 guided in the second casing 56, for example, the piston rod 20 can be equipped with a sloped contact surface and in which case the roller bodies could be working together with the piston rod 20.

This operating design is especially suitable for working cylinders that are in use without piston rods. With the present invention, the working piston 20 can be fixed in a predetermined position for the purpose of positioning.

Although the presently preferred and a number of alternative embodiments of the invention have been shown, other modifications can be made by those persons skilled in the art without departing from the spirit and scope of the appended claims.

I claim:

1. A brake apparatus for retarding relative movement between a movable member and a second member, said apparatus comprising:
   (a) a housing positioned around the perimeter of at least a portion of one of such members;
   (b) a collar fixedly secured to said housing generally around said perimeter of at least a portion of one of such members;
   (c) at least two clamping elements fixedly secured to said collar, said clamping elements each having a respective first surface positioned generally coaxial with and a predetermined distance from at least one of such members, each of said clamping elements being flexible and radially movable to frictionally engage one of such members with said respective first surface to thereby apply a braking force, said clamping elements each having a respective second surface generally radially opposite said respective first surface;
   (d) at least two ball means within said housing, one of said ball means arranged in abutting engagement and longitudinal rolling relationship with a respective said second surface of one of said clamping elements and a second of said ball means arranged in abutting engagement and longitudinal rolling relationship with a respective second surface of a second of said clamping elements for urging said clamping elements into frictional engagement with said one of such members when said ball means longitudinally rolls along each of said a respective second surface in a first longitudinal direction;
   (e) an actuating means disposed within said housing and in coaxial alignment with at least a portion of said clamping elements for imparting rotational movement to said ball means, said actuating means having a third surface spaced from said each of said a respective second surface and arranged in abutting engagement and longitudinal rolling relationship with said ball means in said first longitudinal direction;
   (f) an urging means positioned between and coaxial with each of such members and in abutting engagement with said ball means for urging said ball means in said first longitudinal direction; and
   (g) at least one of said second and said third surfaces having a preselected inclined with respect to the longitudinal axis of said at least one of such members such that the radial distance between said second and said third surfaces decreases in said first longitudinal direction.

2. A brake apparatus for retarding relative movement between a movable member and a second member, said apparatus comprising:
   (a) a housing positioned around the perimeter of at least a portion of one of such members;
   (b) a collar fixedly secured to said housing generally around said perimeter of at least a portion of one of such members;
   (c) a bushing disposed between an inside surface of said collar and an outer surface of said portion of one of such members;
   (d) at least two clamping elements fixedly secured to said collar, said clamping elements each having a respective first surface positioned generally coaxial with and a predetermined distance from at least one of such members, each of said clamping elements being flexible and radially movable to frictionally engage one of such members with said respective first surface to thereby apply a braking force, said clamping elements each having a respective second surface generally radially opposite said respective first surface;
   (e) at least two ball means within said housing, one of said ball means arranged in abutting engagement and longitudinal rolling relationship with a respective said second surface of one of said clamping elements and a second of said ball means arranged in abutting engagement and longitudinal rolling relationship with a respective second surface of a second of said clamping elements for urging said clamping elements into frictional engagement with said one of such members when said ball means longitudinally rolls along each of said a respective second surface in a first longitudinal direction;
   (f) an actuating means disposed within said housing and in coaxial alignment with at least a portion of said clamping elements for imparting rotational movement to said ball means, said actuating means having a third surface spaced from said each of said a respective second surface and arranged in abutting engagement and longitudinal rolling relationship with said ball means in said first longitudinal direction;
   (g) an urging means positioned between and coaxial with each of such members and in abutting engagement with said ball means for urging said ball means in said first longitudinal direction; and (h) at least one of said second and said third surfaces having a preselected incline with respect to the longitudinal axis of said at least one of such members such that the radial distance between said second and said third surfaces decreases in said first longitudinal direction.

3. A brake apparatus, according to claim 2, wherein said movable member is movable in at least one of both a rotational and longitudinal direction.

4. A brake apparatus, according to claim 3, wherein movement of such movable member in said rotational and said longitudinal direction occurs simultaneously.

5. A brake apparatus, according to claim 2, wherein said brake apparatus further comprises a release means positioned within said housing and in engagement with said actuating means for releasing frictional engagement of said clamping elements with said one of such members by exerting a force on said actuating means in a direction opposite to an actuating force exerted on said actuating means and thereby imparting rotational movement to said ball means in a second longitudinal direction between said second and said third surfaces.

6. A brake apparatus, according to claim 5, wherein said frictional engagement release means comprises:
  (a) a bearing plate positioned in alignment with said actuating means;
  (b) means for securing said bearing plate within said housing; and
  (c) a spring means placed into bearing engagement between a top surface of said bearing plate and a cooperating surface of said actuating means for urging said actuating means in said second longitudinal direction.

7. A brake apparatus, according to claim 5, wherein said release means comprises a cylinder controllable by fluid pressure for urging said actuating means in said second longitudinal direction.

8. A brake apparatus, according to claim 5, wherein said collar and said clamping elements are formed as a single element.

9. A brake apparatus, according to claim 8, wherein said clamping elements are formed in said single element by providing longitudinal slots having a preselected width and which begin at one end of said clamping elements and extend for a preselected length from said one end.

10. A brake apparatus, according to claim 9, wherein said brake apparatus further comprises a recessed area on each of said clamping elements formed intermediate said one end of said clamping elements and an end of said collar, said recessed area receives a respective said ball means therein during assembly and disassembly of said brake apparatus and increases flexibility of said clamping elements adjacent said recessed area.

11. A brake apparatus, according to claim 10, wherein said single element collar and clamping elements are formed from a material that enables said clamping elements to return to said predetermined distance from said one of such members when out of said frictional engagement with said one of such members.

12. A brake apparatus, according to claim 2, wherein said preselected incline is on said second surface.

13. A brake apparatus, according to claim 2, wherein said brake apparatus further comprises a spacer means positioned between one of said inside surface of said collar and an outer surface of said bushing, and said outer surface of said portion of said one of such members and an inside surface of said bushing for maintaining said predetermined distance between said first surface of said each of said clamping elements and said one of such members when said brake apparatus is in a release position.

14. A brake apparatus, according to claim 13, wherein said spacer means is positioned between said outer surface of said bushing and said inside surface of said collar.

15. A brake apparatus, according to claim 2, wherein said actuating means is controlled by fluid pressure and said brake apparatus includes a fluid pressure receiving chamber.

16. A brake apparatus, according to claim 15, wherein said actuating means operates as a piston and said fluid pressure receiving chamber is enclosed on a first and a second side by said housing, on a third side by said collar and on a fourth side by said actuating means, said fourth side serving as a piston head.

17. A brake apparatus, according to claim 2, wherein said urging means further comprises:
  (a) a generally flat plate having one face thereof in abutting relationship with a surface on each of said ball means intermediate contact surfaces of said ball means which provide said rolling relationship between said ball means and said second and said third surfaces; and
  (b) a spring means in bearing engagement with the opposite face of said flat plate and said actuating means for urging said each of said ball means in said first longitudinal direction, said spring means being precompressed in an amount sufficient to maintain said each of said ball means in said rolling relationship with said second and said third surfaces.

18. A brake apparatus, according to claim 2, wherein said third surface of said actuating means includes said preselected incline and said brake apparatus further comprises a stop means secured to at least one of said actuating means and said clamping elements for preventing said ball means from being pushed in a longitudinal direction beyond a predetermined point.

* * * * *